Figure 1:
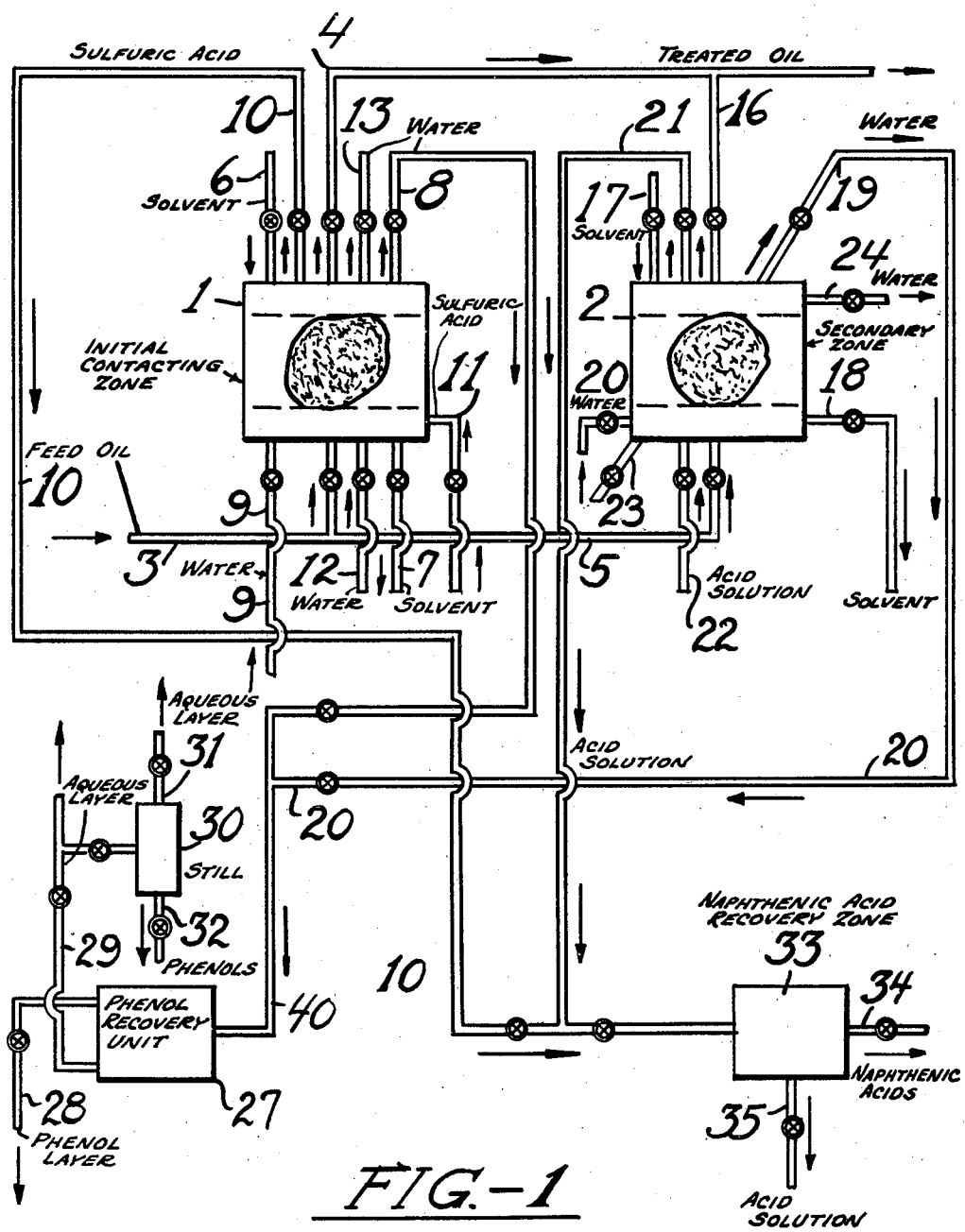

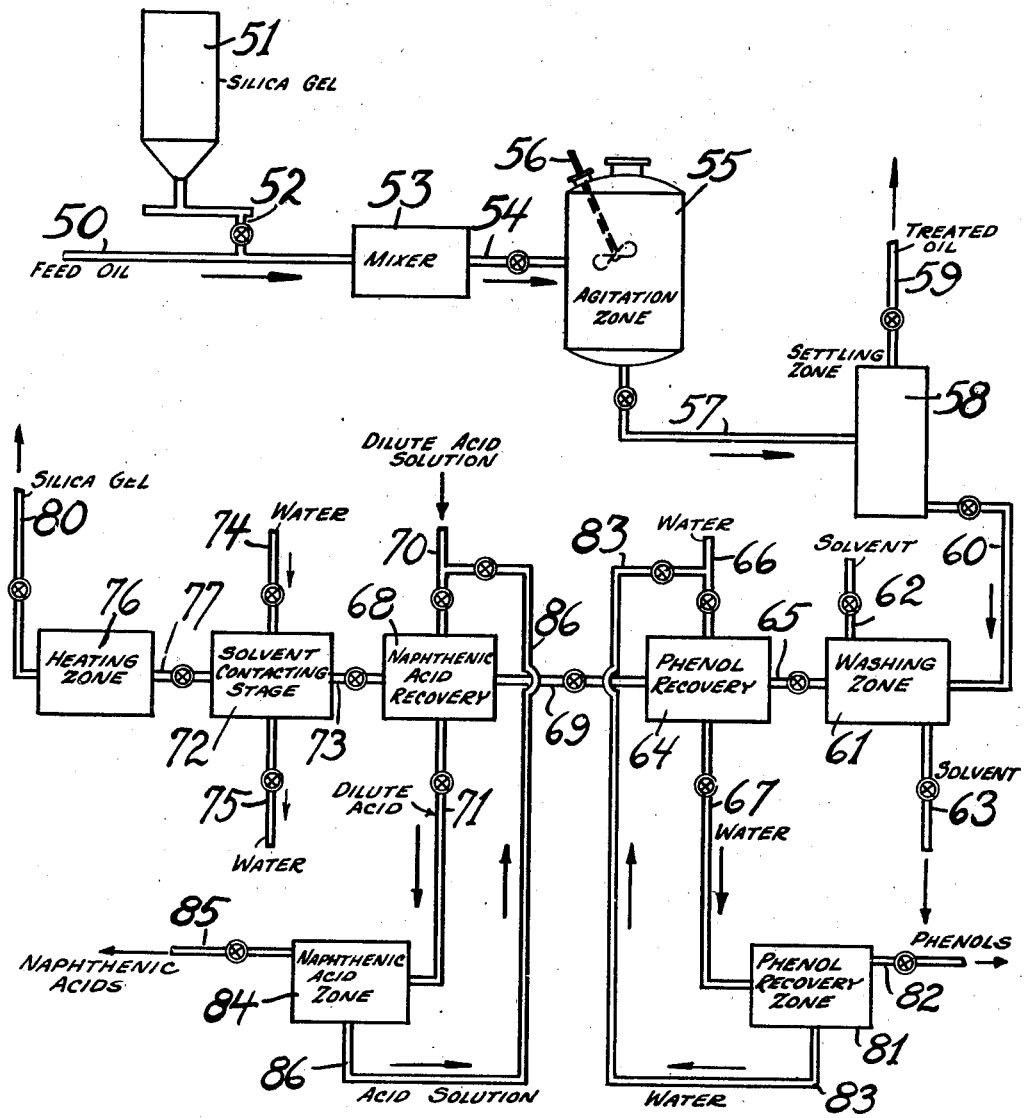

Patented Oct. 5, 1943

2,331,244

UNITED STATES PATENT OFFICE 2,331,244

REFINING MINERAL OILS

Barney R. Strickland, Roselle, N. J., assignor to Standard Oil Development Company, a corporation of Delaware Application December 7, 1940, Serial No. 369,062

4 Claims. (Cl. 260—514)

The present invention relates to the refining of mineral oils. The invention is especially concerned with the removal, segregation and recovery of naturally occurring acidic oxygen containing compounds from mineral oils containing the same. The invention is particularly concerned with an improved method for the removal and recovery of naturally occurring petroleum oil phenols and petroleum oil naphthenic acids utilizing a solid reagent consisting substantially of a highly porous silica gel prepared under certain specific conditions whereby a critical quantity of hydrated water is present in the silica gel. The present invention not only recovers these valuable materials in an efficient and economical manner, but also produces a high quality treated oil product.

It is known in the art to remove and recover petroleum oil phenols, as well as petroleum oil naphthenic acids by various methods since these materials are relatively valuable and are desirable, for example, as inhibiting agents and as intermediate feed products. One method currently employed is to contact the phenol and naphthenic acid containing petroleum oil with various aqueous solutions of alkali metal hydroxides and the like in order to form the corresponding phenolates and naphthenates. These salts are soluble in and are removed with the spent aqueous alkali metal hydroxide solution. The corresponding phenols are then recovered from the salts by treating the same with dilute acids and the like in order to form the corresponding phenols or naphthenic acids. Operations have also been proposed by which these valuable constituents are removed and recovered from feed oils containing the same utilizing a solid adsorbent such as various zeolites, oxides of aluminum and bauxite.

I have now discovered an improved method of removing and recovering these valuable constituents from feed oils containing the same in an efficient manner by which a high yield is secured and which also results in the production of a treated oil product of high quality. In accordance with my invention the mineral oil containing the recoverable phenolic type compounds and naphthenic acids is contacted with a solid reagent consisting substantially of a highly porous silica gel prepared under certain specific conditions whereby a critical quantity of hydrated water is present in the silica gel under conditions to substantially fully remove these constituents from the feed oil. The spent silica gel is then handled in a manner to remove, segregate, and recover the phenolic type compounds and naphthenic acids from the reagent and to fully regenerate or revivify the same. The process of my invention may be readily understood by reference to the attached drawings illustrating modifications of the same.

Figure 1 illustrates a modification of the invention in which the feed oil is passed through a bed of silica gel, while Figure 2 illustrates another modification in which a slurry of silica gel is utilized.

Referring particularly to Figure 1, it is assumed that the phenolic type constituent and naphthenic acid containing feed oil is a petroleum oil boiling in the kerosene oil boiling range. For purposes of illustration it is also assumed that the silica gel is in beds and that two silica gel contacting units are employed. It is to be understood that any number of units may be utilized and may be arranged in any desirable manner. The feed oil is introduced into initial contacting zone 1 by means of feed line 3. This material flows upwardly through zone 1 and contacts a bed of silica gel which preferably comprises a small particle size so that a large surface area is secured. Temperature and pressure conditions are adjusted in a manner to substantially completely remove the phenols and naphthenic acids from the feed oil. The treated feed oil is withdrawn from initial contacting zone 1 by means of line 4, withdrawn from the system and handled in any manner desirable. At the end of a fixed time period in which the effectiveness of the silica gel is decreased to a predetermined efficiency, the feed oil is passed into secondary silica gel contacting zone 2 by means of line 5 and withdrawn by means of line 16. The silica gel in contacting unit 1 containing the adsorbed phenols and naphthenic acids is handled in a manner to remove and segregate these compounds and to regenerate the silica gel. This is preferably accomplished by washing the silica gel with suitable solvents. For the purposes of description it is assumed that the silica gel is initially contacted with a relatively low boiling petroleum oil distillate solvent having a preferential solubility for the petroleum oil remaining in the silica gel bed. This petroleum oil washing solvent may be introduced by means of line 6 and withdrawn by means of line 7. The silica gel bed is then contacted with a solvent having a preferential selectivity for the phenolic type compounds which for the purposes of description is taken to be water. The water is introduced into initial contacting plant 1 by means of line 9 and withdrawn by means of line 8. Sufficient water is introduced at a temperature and pressure which is adapted to substantially fully remove the phenols from the spent silica gel bed. The silica gel bed, free of petroleum oil and adsorbed petroleum phenols, is then contacted with a solvent having a preferential selectivity for the naphthenic acid compounds.

For the purposes of illustration, this solvent is taken to be a 5% sulfuric acid solution which is introduced by means of line 11 and withdrawn by means of line 10. The silica gel bed is then treated in a manner to fully regenerate the same. This is preferably accomplished by washing the bed with a solvent, preferably comprising water, in order to remove the acidic constituents. The solvent for removing the acidic constituents is introduced by means of line 12 and withdrawn by means of line 13. The silica gel bed, free of acidic constituents, is heated to a temperature preferably in the range from about 400° F. to about 750° F., in order to fully regenerate the same. At the end of the cycle in which the efficiency of the silica gel in contacting unit 2 drops to a certain predetermined point, the feed oil is again passed into the regenerated silica gel in unit 1. The silica gel-contacted oil is withdrawn from contacting unit 2 by means of line 16, withdrawn from the system, and handled as desired. The silica gel in contacting unit 2 containing the adsorbed phenols and naphthenic acids, is handled in a manner similar to that described with respect to unit 1 in a manner to remove and segregate the phenols and naphthenic acids and to regenerate the silica gel. This is accomplished by initially washing the bed with a relatively low boiling petroleum solvent introduced by means of line 17 and withdrawn by means of line 18, removing the phenolic type constituents by contacting the silica gel with a preferential solvent for the phenolic type compounds which is introduced by means of line 20 and withdrawn by means of line 19. This solvent preferably comprises water. The naphthenic compounds are removed by contacting the silica gel bed with a dilute acid solution which is introduced by means of line 22 and withdrawn by means of line 21. The silica gel bed is regenerated by initially removing the acidic constituents by treating the bed with a solvent which preferably comprises water. The solvent is introduced by means of line 23 and withdrawn by means of line 24. The silica gel bed, free of acidic constituents, is regenerated by heating to a temperature in the range from about 400° F. to about 750° F. The aqueous solution of phenols which is removed from the respective contacting units by means of line 40 is introduced into phenol recovery unit 27. In this unit, when treating relatively high boiling petroleum oils the relatively high boiling phenols will separate from the aqueous layer. The phenol layer is withdrawn from the phenol recovery unit 27 by means of line 28, while the aqueous layer is withdrawn by means of line 29 and preferably recycled as described if a phenolic solvent to the system. As the petroleum oil contacted is a relatively wide boiling fraction and contains relatively low boiling and relatively high boiling petroleum phenols, it may be desirable to fully recover the relatively low boiling phenols from the aqueous layer by distilling the same prior to returning the aqueous layer as solvent to the silica gel contacting units. This is accomplished by passing the aqueous layer to still 30, operated under conditions to remove overhead the aqueous layer by means of line 31, and to remove as the bottoms the relatively low boiling phenolic constituents by means of line 32.

The acid solvent containing the naphthenic constituents, removed from the respective contacting plants by means of lines 10 and 21, respectively, is similarly handled in a manner to segregate the naphthenic acids. The acid solvent is introduced into naphthenic acid recovery zone 33 in which a layer separation will occur between the acid solution and the naphthenic acids. The naphthenic acids are removed by means of line 34 and further refined as desired, while the acid layer is withdrawn by means of line 35 and preferably recycled as acid solvent to the contacting plants as described.

Referring specifically to Figure 2, feed oil is introduced into the system by means of line 50. The feed oil is mixed with a quantity of silica gel which for purposes of illustration is taken to be powdered silica gel and which is introduced from silica gel bin 51 by means of screw conveyor 52. The oil and the silica gel are passed through mixer 53 and then passed as a slurry by means of line 54 into agitation zone 55 which may comprise any suitable number of agitating units arranged in any desirable manner. Complete mixing is secured by means of agitator 56. The mixture is withdrawn from zone 55 by means of line 57 and introduced into settling unit 58. The separation of the solid phase from the liquid phase may be facilitated by any desirable means such as baffles, settling means, and the like. The treated oil is withdrawn from unit 58 by means of line 59 and handled in any desirable manner. The silica gel containing adsorbed thereon the phenolic type compounds and naphthenic acids is withdrawn from unit 58 by means of line 60 and handled in a manner to remove and recover the phenols and naphthenic acids and to substantially fully regenerate the silica gel. This is preferably accomplished by passing the silica gel to washing unit 61 in which the occluded relatively high boiling petroleum oil constituents are removed by washing with a relatively low boiling petroleum oil solvent which is introduced by means of line 62 and withdrawn by means of line 63. The washed silica gel is introduced into phenol recovery unit 64 by means of line 65, in which the phenols are removed by contacting the silica gel with a solvent having a preferential solubility for phenolic type compounds. For the purposes of illustration it is assumed that the solvent comprises water which is introduced by means of line 66 and withdrawn by means of line 67. The silica gel is passed to naphthenic acid recovery unit 68 by means of line 69 in which the naphthenic acids are removed from the silica gel by contacting with a suitable solvent which for the purposes of description is assumed to be a dilute acid solution which is introduced by means of line 70 and withdrawn by means of line 71. The silica gel, free of adsorbed phenolic type compounds and naphthenic acid type constituents, is handled in a manner to substantially fully regenerate the same. This is preferably secured by passing the silica gel to solvent contacting stage 72 by means of line 73 and treating the same with a solvent which preferably comprises water which is introduced by means of line 74 and withdrawn by means of line 75. The silica gel, free of acidic constituents, is passed to heating unit 76 by means of line 77 and therein heated to a temperature in the general range from about 400° F. to about 750° F. The silica gel is withdrawn from the latter stage by means of line 80 and recycled to the system as described. The aqueous solution of phenol, withdrawn from unit 64 by means of line 67, is passed to phenol recovery unit 81 in which a layer separation occurs between the relatively high boiling phenols and the aqueous solution. The relatively high boiling phenols are withdrawn by means of line 82, while the aqueous solution is withdrawn by means of line 83 and recycled to unit 64. The phenolic layer is withdrawn by means of line 82, distilled or further refined in any manner desirable. Under certain conditions when the petroleum oil treated is of a relatively wide boiling range and the aqueous solution contains relatively low boiling soluble phenols, it may be desirable to distill the aqueous solution withdrawn from recovery unit 81 in order to remove the relatively low boiling phenols prior to recycling the aqueous solution to unit 64. The acid solution containing the naphthenic acids withdrawn from unit 68 by means of line 71 is passed to naphthenic acid recovery unit 84 in which a layer separation occurs between the naphthenic acids and the dilute acid solution. The naphthenic acids are withdrawn from the system by means of line 85, distilled or further refined in any manner desirable. The dilute acid solution is withdrawn from unit 84 by means of line 86 and recycled to unit 68.

The processes of the present invention may be widely varied. Although the method may be employed for the recovery and segregation of phenolic type constituents and naphthenic acids from any feed oil, it is particularly applicable in the recovery of relatively high boiling petroleum phenols and petroleum naphthenic acids from petroleum oils boiling in the gas oil and lubricating oil boiling range. These substances, due to their characteristics, have heretofore been relatively difficult to segregate.

The solid reagent of the present invention, consisting of silica gel, comprises a synthetic material having a high porosity and which contains a critical quantity of hydrated water. In general the water concentration should be in the general range of about 1% to about 7%, preferably in the range from about 3% to about 5%. Although any method which produces a silica gel of this character may be employed, it is preferred that the silica gel be prepared by acidifying a sodium silicate solution with a mineral acid, preferably with a dilute sulfuric acid solution having a concentration in the range from about 5% to about 20%, followed by washing with a solvent characterized by having the ability to fully remove the acidic constituents. This solvent preferably comprises water. The washed acid-treated silica gel is then heated to a temperature in the general range from about 400° F. to about 750° F. I have found that particularly desirable results are secured when the silica gel is heated to a temperature in the range from about 550° F. to about 600° F. The time the silica gel is held at these temperatures will depend to some extent upon the character of the silica gel, the particular acid used, and the concentration of the same. In general the time is sufficiently long to secure the desired porosity and the desired dehydration of the silica gel. In general this time will vary in the general range from about thirty minutes to about ninety minutes. Although a relatively large particle size may be employed, in general it is preferred to employ silica gel of relatively small particle size, particularly powdered silica gel. The methods of contacting may be either by utilizing beds or by employing a slurry.

The operating conditions likewise may be widely modified. The flow of the respective treating agents may be either upflow or downflow. Temperatures and pressures may vary and will depend upon the particular feed oil being treated, the quantity and character of the phenols and naphthenic acids present, as well as upon the particular silica gel being used and upon the feed rates and particle size. In general it is preferred to employ atmospheric temperatures and pressures, although temperatures in the range from about 30° F. to about 250° F. may be employed in particular instances. If the petroleum oil be of a relatively high viscosity, it may be desirable to employ heating means or to dilute the oil with an inert dilution solvent, as for example a relatively low boiling petroleum oil or with a relatively low boiling hydrocarbon constituent. The feed rates may vary considerably depending upon the general operating conditions, the character of the feed oil being treated, as well as upon the type of silica gel being employed. When the process comprises the utilization of stages, feed rates are in the general range from one to seven volumes of oil per volume of silica gel per hour. The preferred rates are from 1 to 3 volumes of oil per volume of silica gel per hour. When employing a slurry, the amount of slurry is preferably in the range from one volume of silica gel per 5 to 15 volumes of oil.

Although it is not essential, it is preferred that the silica gel, after contact with the oil, be washed with a solvent which will remove occluded oil portions from the silica gel prior to treating the silica gel to remove the adsorbed phenols and naphthenic acids. This solvent may be any relatively low boiling hydrocarbon. A desirable material comprises naphtha boiling in the range from about 200° F. to about 300° F.

The phenols are preferably removed from the silica gel by treating with water at normal temperatures and pressures. The amount of water employed may vary widely depending upon the quantity of phenols present. In general it is preferred to employ from about one to about four volumes of water per volume of silica gel in order to displace the phenolic type constituents. A preferred modification of utilizing water at normal temperatures and pressures for the displacement of the phenolic type constituents is to agitate the mass with air or a similar agitating means. Under certain conditions it may be desirable to employ heated water or steam in order to remove the phenols, although in general this method is not preferred. The aqueous solution, after removal from the silica gel bed, will form two phases comprising a phenol phase and an aqueous water phase. The phenol phase is separated and may be further refined in any manner desirable. Although the aqueous phase may be distilled in order to remove any relatively low boiling soluble phenolic type compounds present, it is preferred to recirculate the same as a phenol solvent directly to the silica gel contacting units.

The acid solution employed for the removal of the naphthenic type constituents from the silica gel likewise may vary considerably. Any mineral acid may be employed, although in general it is preferred to utilize a dilute sulfuric acid having an acid concentration in the range from about 2% to about 10%. A particularly desirable solvent for removing naphthenic type constituents from the silica gel comprises a 5% sulfuric acid solution. This solution, after the removal of the naphthenic acid constituents, is likewise preferably recycled to the system as described.

The spent silica gel, free of naphthenic acid and phenolic type constituents, may be handled in any suitable manner in order to regenerate the same. Although the spent silica gel, free of the phenols and naphthenic acid constituents, may be satisfactorily regenerated by washing with solvents such as alcohol or a 95% ethyl alcohol solution or equivalent, it is preferred that the spent silica gel be regenerated by washing with a quantity of water, followed by heating the same in a manner to secure the desired porosity and the desired removal of water.

In order to further illustrate the present invention, the following example is given which should not be construed as limiting the same in any manner whatsoever.

Example 1

A petroleum distillate boiling in the kerosene boiling range, having a phenol number [1] of 200, was contacted with a silica gel. The silica gel was prepared by treating an aqueous sodium silicate solution with a dilute sulfuric acid solution. The resulting silica gel was washed with water to remove the acidic constituents, and heated at a temperature of about 572° F. for approximately thirty minutes. The silica gel had a mesh of about twenty to sixty. When contacting the feed oil with the silica gel at a temperature of about 70° F. and at a feed rate of one volume of feed oil per volume of silica gel per hour, approximately four volumes of phenol-free feed oil were obtained per volume of silica gel.

Phenols and naphthentic acid constituents were segregated and removed by initially washing the silica gel with water, then with sulfuric acid in the manner described, followed by fully regenerating the silica gel.

Apparently the silica gel of the present invention reacts with the naturally occurring acidic oxygen containing compounds to form reaction products which may be readily regenerated from the silica gel. The regeneration operation may be controlled in a manner to preferentially first regenerate the phenolic type constituents which may be separated. After separation of the phenolic type constituents the naphthenic acid constituents may be then readily regenerated and separated.

What I claim as new and wish to protect by Letters Patent is:

1. Process for the recovery and segregation of naturally occurring petroleum oil phenols and petroleum oil naphthenic acids from petroleum oils which comprises contacting feed petroleum oil containing these materials with a solid reagent consisting substantially of a highly porous synthetic silica gel containing from about 1% to about 7% of water, at atmospheric temperatures and pressures whereby these materials are removed from the oil, separating the silica gel from the oil, contacting the silica gel at atmospheric temperatures and pressures with water whereby the petroleum oil phenols are recovered from the silica gel, contacting the silica gel free of petroleum oil phenols with a dilute acid solution at atmospheric temperatures and pressures whereby the naphthenic acids are recovered from the silica gel, treating the silica gel with a solvent comprising water, then heating the same at a temperature in the range from about 400° F. to about 750° F., and recycling the silica gel to the system.

2. Process for the recovery and segregation of various naturally occurring acidic oxygen containing compounds from petroleum oils which comprises contacting a feed petroleum oil containing these compounds with a solid reagent consisting essentially of a highly porous synthetic silica gel containing from about 1% to about 7% of water, which is prepared by acidifying a sodium silicate solution with a sulfuric acid solution of a concentration in the range from about 5% to about 20% followed by washing with water and heating at a temperature in the range from about 550° F. to about 600° F., at atmospheric temperatures and pressures, whereby these compounds are removed from the oil, separating the silica gel, recovering the naturally occurring acidic oxygen containing compounds from said silica gel, and regenerating the same.

3. Process for the recovery and segregation of various naturally occurring acidic oxygen containing compounds from petroleum oils which comprises contacting a feed petroleum oil containing these compounds with a solid reagent consisting essentially of a highly porous synthetic silica gel containing from about 1% to about 7% of water, which is prepared by acidifying a sodium silicate solution with a mineral acid followed by washing the acid treated sodium silicate with a solvent and heating to a temperature in the range from about 400° F. to about 750° F., at atmospheric temperatures and pressures, whereby these compounds are removed from the oil, separating the silica gel, recovering the naturally occurring acidic oxygen containing compounds from said silica gel and regenerating the same.

4. Process for the recovery and segregation of various naturally occurring acidic oxygen containing compounds from petroleum oils, which comprises contacting feed petroleum oils containing these compounds with a solid reagent consisting substantially of a highly porous synthetic silica gel containing from about 1% to about 7% of water, at atmospheric temperatures and pressures, whereby these compounds are removed from the oil, separating the silica gel, removing the naturally occurring acidic oxygen containing compounds from said silica gel by initially treating the silica gel with water and then treating the silica gel with a dilute acid solution, and regenerating the silica gel.

BARNEY R. STRICKLAND.

---

[1] A 200 phenol number is equivalent to 0.2% of phenols, expressed as equivalent milligrams of tertiary amyl phenol per 100 milliliters of oil.